United States Patent [19]

Bath et al.

[11] Patent Number: 5,433,032
[45] Date of Patent: Jul. 18, 1995

[54] APPARATUS FOR REMOVING CONTAMINATED OVERBURDENED SOIL

[75] Inventors: William R. Bath; Charles R. Yemington, both of Houston, Tex.

[73] Assignee: Sonsub, Inc., Houston, Tex.

[21] Appl. No.: 28,330

[22] Filed: Mar. 9, 1993

[51] Int. Cl.⁶ .............................. E02F 3/76; E02F 3/64
[52] U.S. Cl. .......................................... 37/407; 37/412; 37/419
[58] Field of Search .......... 37/4, 80 A, 108 A, 118 A, 37/122, 124, 126 AD, 141 R, DIG. 5, 304, 364, 383, 412, 429, 419, 434, 442, 446, 407

[56] References Cited

U.S. PATENT DOCUMENTS

| | | | |
|---|---|---|---|
| 8,341 | 9/1851 | Gavett | 37/80 A |
| 2,573,720 | 11/1951 | Lichtenberg | 37/126 AD |
| 3,460,279 | 8/1969 | Martin | 37/124 X |
| 4,037,336 | 7/1977 | Benson | 37/124 |
| 4,071,965 | 2/1978 | Lee | 37/4 |
| 4,389,800 | 6/1983 | Goby | 37/124 |
| 4,393,608 | 7/1983 | Hodge | 37/126 AD X |
| 4,993,498 | 2/1991 | Fresnel | 37/4 X |

Primary Examiner—Randolph A. Reese
Assistant Examiner—John A. Ricci
Attorney, Agent, or Firm—Pravel, Hewitt, Kimball & Krieger

[57] ABSTRACT

An apparatus for removing a predetermined amount of contaminated overburdened soil. The apparatus comprises a container adapted to move along the soil. It is advanced forward and controlled by a backhoe or other crane configuration. A blade is attached at the front end of the container to cut a predetermined layer of overburdened soil. Vertical plates are included to cut the edge of the soil at the outer ends of the blades and confine the soil within the container. An air control device is also provided for controlling the flow of airborne particulates resulting from the cutting operation.

8 Claims, 3 Drawing Sheets

APPARATUS FOR REMOVING CONTAMINATED OVERBURDENED SOIL

BACKGROUND OF THE INVENTION

1. Field of the Invention

The present invention relates to an apparatus for removing contaminated overburdened soil. More particularly, the present invention relates to an apparatus adapted to be attached to the end of a backhoe, excavator or similar device and advanced forward removing a predetermined amount of contaminated overburdened soil.

2. Description of the Prior Art

In remedial clean up efforts of solid waste burial sites, trenches, spills and other contaminated areas, it is necessary to remove the contaminated overburdened soil. Further, during such removal process, it is necessary to provide for the entrapment of any contaminants that would otherwise become airborne, primarily by wind-blown action. Thus, it is desirable to control dust during the removal process.

Additionally, since objects in waste soil tend to migrate toward the surface, it is preferable to remove the overburdened soil in thin layers so that the buried objects and other contaminants can be detected before they are disturbed.

SUMMARY OF THE INVENTION

The present invention relates to an apparatus for removing a predetermined amount of contaminated overburdened soil. The apparatus features a container adapted to store the removed soil which is supported from the end of a backhoe or other crane. The backhoe, or other crane, provides the mechanism for applying a downward load on the container to keep it against the contaminated soil and a mechanism for advancing the container forward. The apparatus also features a replaceable blade which is attached at the forward end of the container at a predetermined level thereby defining the depth of the cut. Vertical cheek plates are attached at either side of the container which serve to cut the end of the soil at the outer edges of the blade and to provide vertical side wall support for the container to confine the soil within the container. Front and rear dust control chambers are provided which restrict the movement of airborne contaminants during the excavating activities.

BRIEF DESCRIPTION OF THE DRAWINGS

In order to more fully understand the drawings referred to in the detailed description of the present invention, a brief description of each drawing is presented.

DETAILED DESCRIPTION OF THE INVENTION

Figure 1:
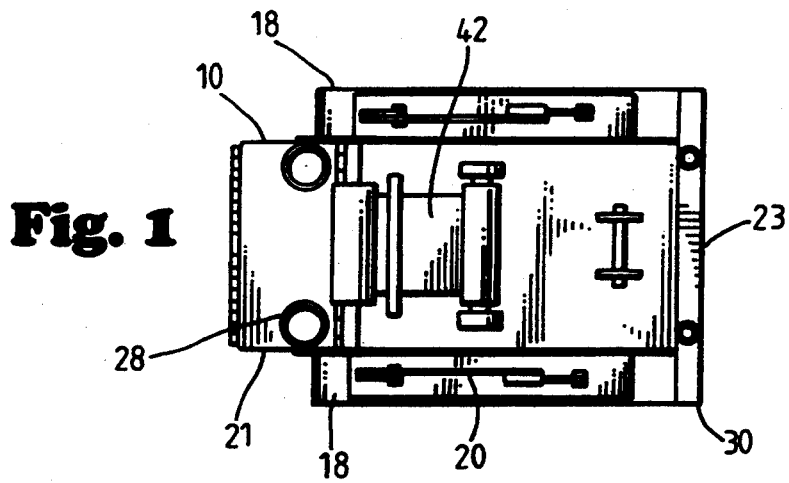
FIG. 1 is a top view of the present invention.
Figure 2A:
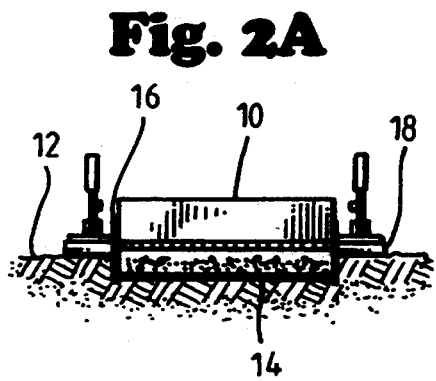
FIG. 2A is a front elevation view of the present invention making a first cut.
Figure 2B:
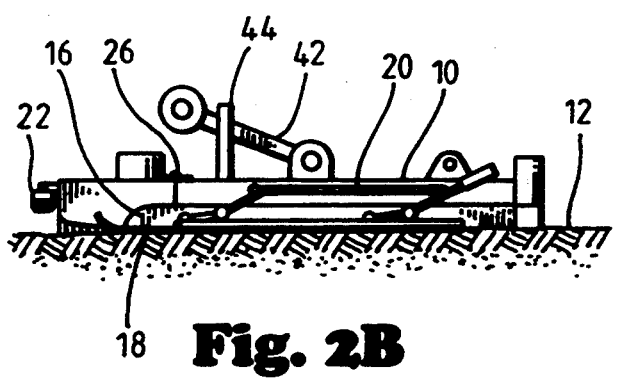
FIG. 2B is a side view of the present invention making a first cut.
Figure 3A:
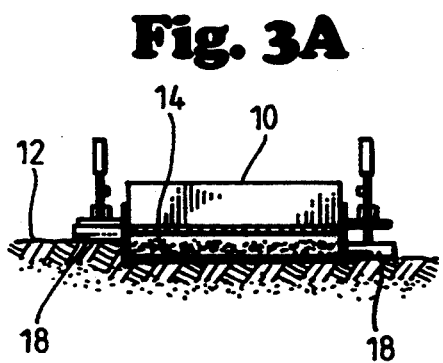
FIG. 3A is a front view of the present invention making a subsequent cut.
Figure 3B:
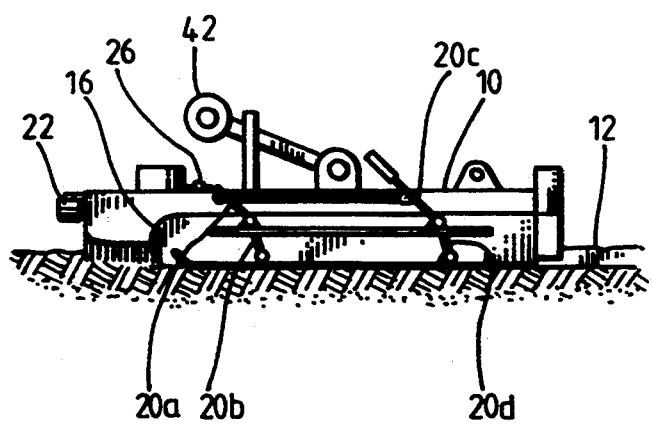
FIG. 3B is a side view of the present invention making a subsequent cut.

Referring to FIGS. 1, 2A–2B and 3A–3B, container 10 is shown resting on soil 12. A blade 14 is mounted at the lower leading edge of the container 10. The container also includes a bottom plate 11, an end plate 13 and a top plate 15 (see FIG. 6). Two vertical cheek plates 16 are attached to the side of the container and cut the soil on either side of blade 14. In this manner, blade 14 separates the bottom portion of the soil while the front end of cheek plates 16 cut the outer edge of the soil and confine it within the container. The horizontal control plates 18 are attached to the sides of the container through a linkage assembly 20 comprising a series of linkage legs 20a–d which provide for the manual extension of the horizontal control plate relative to the container. In this manner, once an initial cut has been performed as shown in FIGS. 2A and 2B, the left-hand horizontal control plate can be lowered as shown in FIGS. 3A and 3B to insure that the container remains level with the soil while the next pass is made.

The horizontal control plates 18 also serve to pack the soil after the cut. The bottom plate 15 serves to compact the recently disturbed soil before the next pass is made.

A sensor mount 22 is attached to the leading edge of the container and is adapted to support radiation sensors and other monitors which may be used to survey material in the top soil before it enters the container 10.

Figure 4:
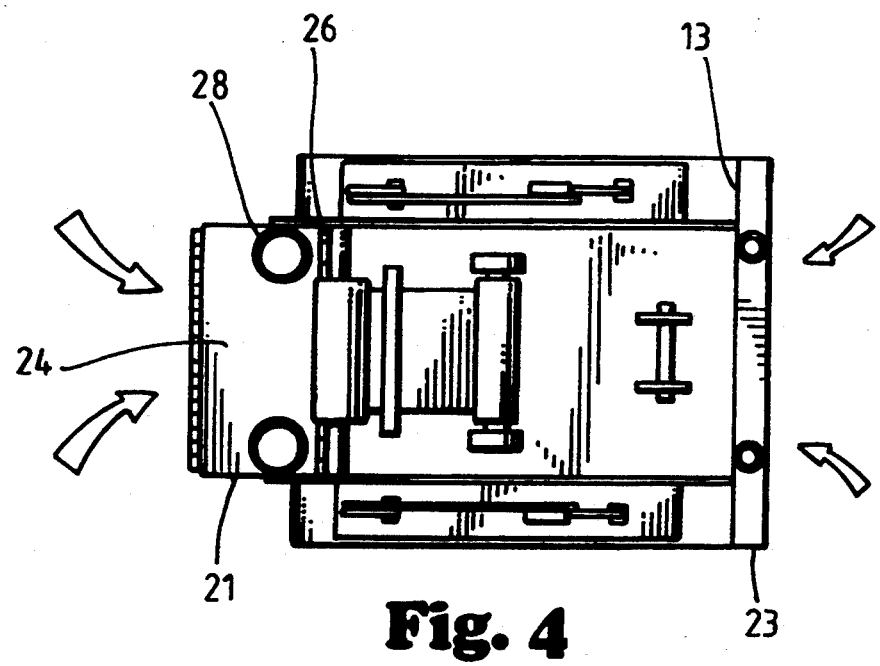
FIG. 4 is a top view of the present invention focusing on dust control features.
Figure 5:
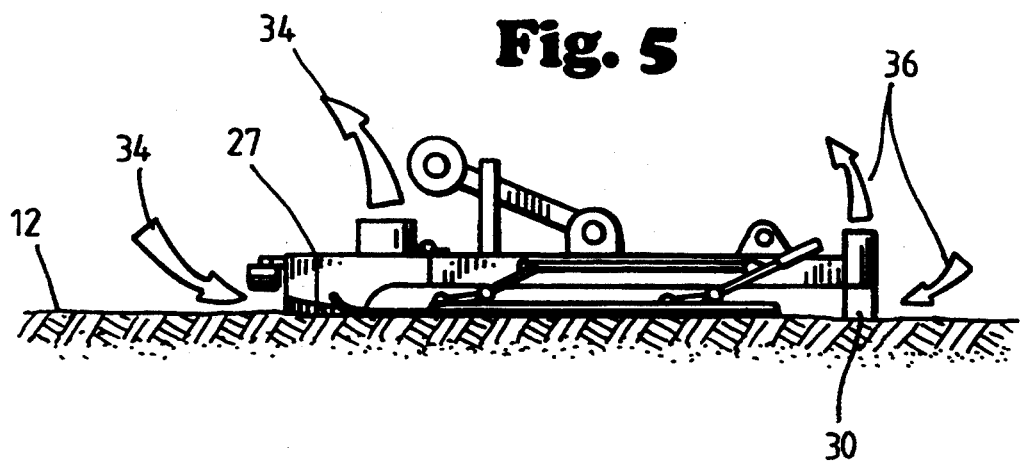
FIG. 5 is a side view of the present invention focusing on dust control features.

Referring now to FIGS. 4 and 5, a front region 21 and a rear region 23 are provided for dust control. Front region 21 is defined by a dust cover 24 which is attached over the forward end of the container, preferably hinged along line 26. Flexible and vertical dust covers 27 form the side walls of the front region. Hose connections 28 are provided at the top of plate 24 enabling the connection of flexible hoses and the drawing of a vacuum through an exhaust hose to remove the dust and other airborne contaminants as it enters the container.

The rear region 23 is a vacuum manifold 30 which is attached at the trailing edge 13 of the container. The exhaust manifold 30 includes hose connections 32.

Arrows 34 show the circulation of air in the front region 21 or forward dust collection chamber. Arrows 36 show the flow of air in the rear region 23 through the vacuum manifold 32.

Figure 6:
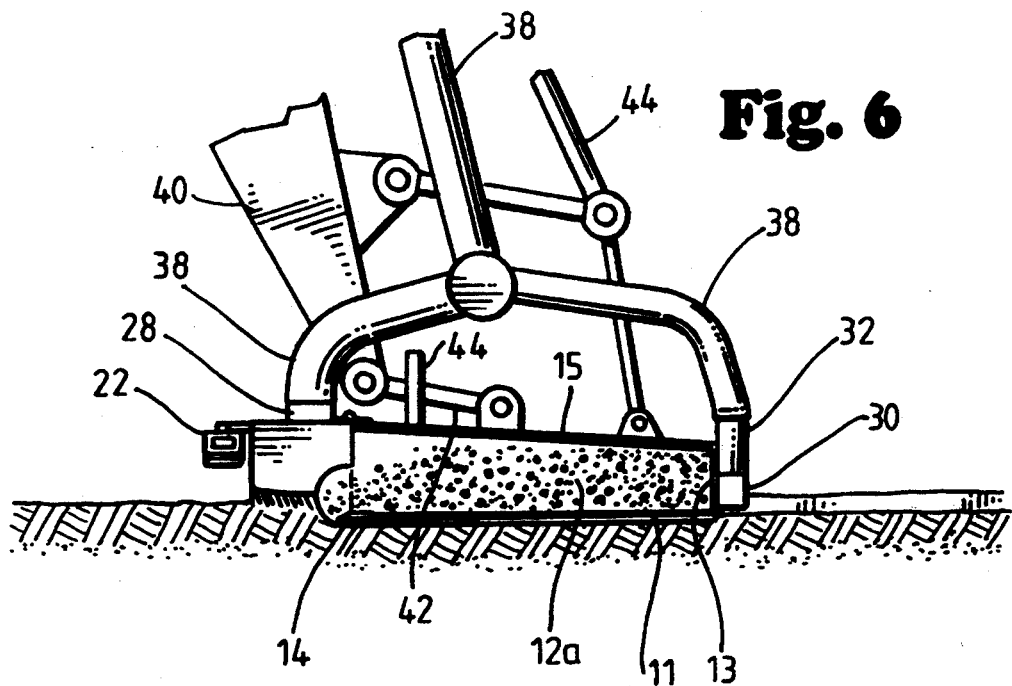
FIG. 6 is a cross-sectional side view of the present invention attached to a backhoe.
Figure 7:
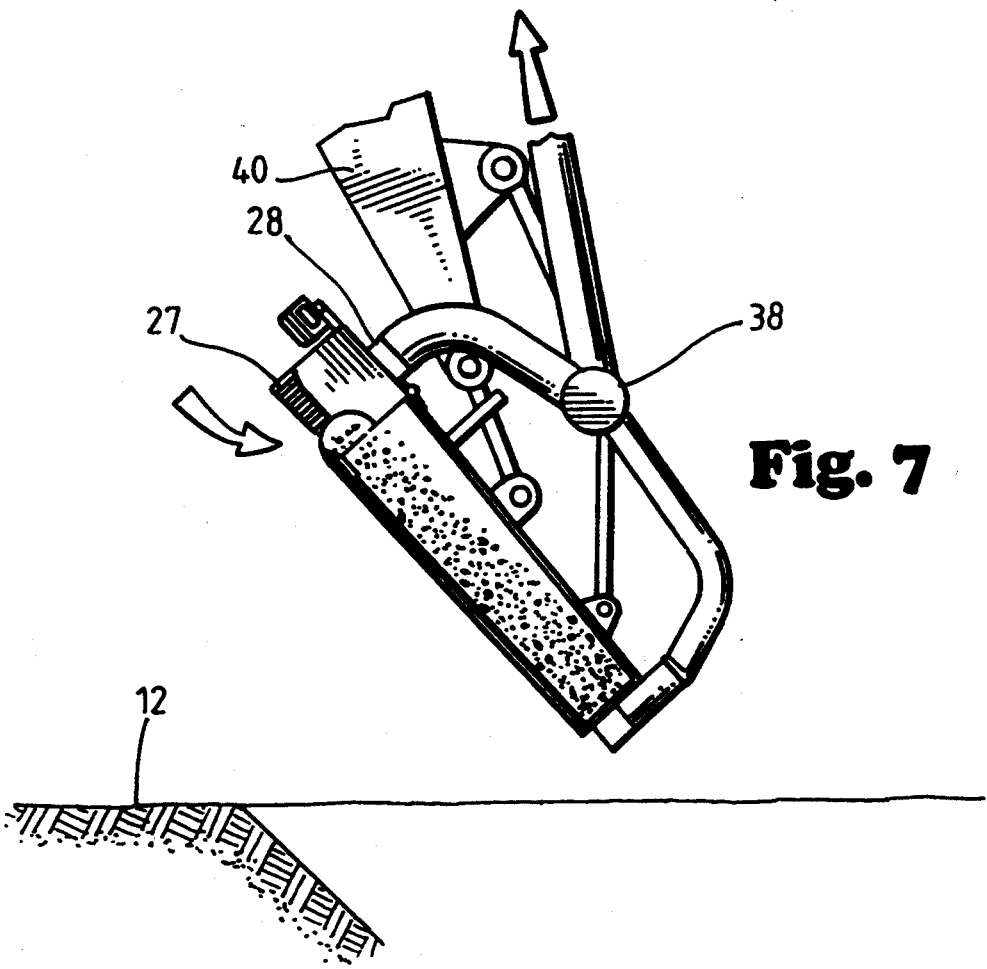
FIG. 7 is a cross-sectional side view of the present invention attached to a backhoe in a upwardly moving position.

Referring now to FIGS. 6 and 7, hoses 38 are shown attached to connections 28 and 32. In this manner, an exhaust fan (not shown) may draw the vacuum withdrawing the airborne particles from the front region 21 and rear region 23 upwardly away from the excavation site.

Referring still to FIGS. 6 and 7, the present invention is shown in a cross-sectional view attached to the working end of a backhoe. The backhoe arm 40 is attached to a torsional mount 42 which is normally held in an upward mode by a spring (not shown) contained within housing 44. The backhoe arm 40 includes a series of linkages 44 which are attached to the top plate 15 of container 10 and are used to rotate the container as well as advance it forward in an operating mode. Blade 14 is shown a predetermined distance below the surface of the soil cutting the soil.

As the apparatus is advanced forward by the notion of the backhoe 40, soil 12a is pushed within the container and remains there.

FIG. 7 shows the lifting of the container by the backhoe. In this mode, the air vacuum continues to draw an exhaust on the system as it is lifted to prevent any dust or other contaminants from entering the environment until the soil has been emptied from the container and the backhoe returns the container to its original position for a subsequent cut.

The descriptions given herein are intended to illustrate the preferred embodiment of the apparatus according to the present invention. It is possible for one skilled in the art to make various changes to the details of the apparatus without departing from the spirit of this invention. Therefore, it is intended that all such variations be included within the scope of the present invention as claimed.

What is claimed is:

1. An apparatus for removing a layer of contaminated overburdened soil comprising:
   a container adapted to store removed soil;
   a blade attached at the forward end of said container and positioned to cut a predetermined layer of overburdened soil;
   means for cutting the edge of the soil at each end of the blade, for providing a vertical barrier to confine the soil within the container, for stabilizing said container and for containing all removed soil;
   means for controlling the flow of dust resulting from the cutting of said overburdened soil; and
   means for applying a load on said container against said soil to prevent said container from lifting off said soil and for advancing said container so that said predetermined layer of soil is removed without regard to the contour of the top of the soil.

2. The apparatus according to claim 1 wherein said apparatus further comprises means for sensing the contents of said soil.

3. The apparatus according to claim 2 wherein said sensing means comprises a radiation source.

4. The apparatus according to claim 2 wherein said sensing means comprises a video camera.

5. The apparatus according to claim 1 wherein said cutting means comprises:
   at least two vertical plates attached to the side of said container;
   at least two horizontal plates, each horizontal plate supported at a substantially normal angle to said corresponding vertical plate; and
   means for moving said horizontal plates relative to said vertical plates.

6. The apparatus according to claim 1 wherein said dust control means comprises:
   a first control proximate said blade at the forward end of said container;
   a rear control proximate the trailing end of said container; and
   hoses connecting said first and second controls,
   wherein said first and second controls define a first and second region, respectively, and open air communication with said hoses for transfer of said airborne particulates from said first and second regions through said hoses.

7. An apparatus for removing a layer of contaminated overburdened soil comprising:
   a container adapted to store removed soil;
   a blade attached at the forward end of said container and positioned to cut a predetermined layer of overburdened soil;
   means for cutting the edge of the soil at each end of the blade and for providing a vertical barrier to confine the soil within the container;
   means for controlling the flow of dust resulting from the cutting of said overburdened soil;
   a first control proximate said blade at the forward end of said container;
   a rear control proximate the trailing end of said container;
   hoses connecting said first and second controls, wherein said first and second controls define a first and second region, respectively, and open air communication with said hoses for transfer of said airborne particulates from said first and second regions through said hoses;
   means for applying a load on said container against said soil to prevent said container from lifting off said soil and for advancing said container; and
   means for sensing the contents of said soil.

8. An apparatus for removing a layer of contaminated overburdened soil comprising:
   a container adapted to store removed soil;
   a blade attached at the forward end of said container and positioned to cut a predetermined layer of overburdened soil;
   means for cutting the edge of the soil at each end of the blade, for providing a vertical barrier to confine the soil within the container and for stabilizing said container;
   means for controlling the flow of dust resulting from the cutting of said overburdened soil;
   means for applying a load on said container against said soil to prevent said container from lifting off said soil and for advancing said container; and
   means for sensing the contents of said soil.

* * * * *